(12) United States Patent
Kawamura et al.

(10) Patent No.: US 6,478,712 B1
(45) Date of Patent: Nov. 12, 2002

(54) SMALL SPEED RATIO DETECTION AND CONTROL DEVICES FOR VEHICLE START

(75) Inventors: Yasutaka Kawamura; Masato Koga, both of Atsugi; Masatoshi Akanuma, Fujisawa; Mitsuru Watanabe, Hadano; Satoshi Takizawa, Yokohama; Shigeki Shimanaka, Hadano; Hiroyasu Tanaka, Zama; Junya Takayama, Oomiya, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/831,365

(22) PCT Filed: Sep. 25, 2000

(86) PCT No.: PCT/JP00/06549

§ 371 (c)(1),
(2), (4) Date: May 15, 2001

(87) PCT Pub. No.: WO01/23783

PCT Pub. Date: Apr. 5, 2001

(30) Foreign Application Priority Data

Sep. 30, 1999 (JP) .......................................... 11-278663

(51) Int. Cl.$^7$ ................................................. B60K 41/12
(52) U.S. Cl. .......................................... 477/37; 477/99
(58) Field of Search .................................... 477/37, 99

(56) References Cited

U.S. PATENT DOCUMENTS 5,249,482 A 10/1993 Okahara et al. .............. 74/866

FOREIGN PATENT DOCUMENTS

| EP | 0 905 413 | 3/1999 |
| JP | 5-187532 | 7/1993 |
| JP | 7-4508 | 1/1995 |

*Primary Examiner*—Dirk Wright
(74) *Attorney, Agent, or Firm*—Foley & Lardner

(57) ABSTRACT

An alarm is emitted when a vehicle attempts to start when the speed ratio of a toroidal continuously variable transmission is small. A sensor (63. 67. 73) detects that the speed ratio is smaller than a predetermined range. A microprocessor (61) controls an alarm (68) to operate when an ignition switch (66) is in a position for starting an engine, while the speed ratio is smaller than the predetermined range.

17 Claims, 9 Drawing Sheets

SMALL SPEED RATIO DETECTION AND CONTROL DEVICES FOR VEHICLE START

FIELD OF THE INVENTION

This invention relates to detection of a small speed ratio of a toroidal continuously variable transmission for vehicles on startup.

BACKGROUND OF THE INVENTION

Tokkai Hei 7-4508 published by the Japanese Patent Office in 1995 discloses a toroidal continuously variable transmission for vehicles.

This toroidal continuously variable transmission varies a speed ratio by varying a gyration angle of power rollers gripped between an input disk and an output disk.

The gyration angle variation of the power rollers is performed by driving trunnions which support the power rollers in a perpendicular direction to a rotation shaft of the input disk.

For this purpose, an oil pressure cylinder, which is actuated by discharge oil of an oil pump driven by the engine. is attached to each of the trunnions.

SUMMARY OF THE INVENTION

When the vehicle runs while the engine is stopped, that is, when the vehicle goes down a slope due to an action of gravity. or when the vehicle is towed, for example, the rotation torque of the driving wheels is transmitted to the input disk via the power rollers from the output disk in the toroidal continuously variable transmission.

In connection with the transmission of this torque, the gyration angle of the power rollers vary in a direction which makes the speed ratio small.

Therefore, if the engine is started to start the vehicle after the vehicle has stopped, as the speed ratio is small, the torque required for startup cannot be immediately obtained. So, the toroidal continuously variable transmission largely varies the speed ratio so that the large speed ratio required for vehicle startup can be realized.

The torque increases rapidly due to this sharp variation of the speed ratio. That is, the startup of the vehicle is dull at first, but the vehicle then dashes forward abruptly, and the driver will have an uncomfortable feeling.

It is therefore an object of this invention to inform the driver promptly if a vehicle starts up when the speed ratio of a toroidal continuously variable transmission is small.

It is a further object of this invention to start the vehicle smoothly even when the speed ratio of the toroidal continuously variable transmission is small.

It is still a further object of this invention to detect the gyration angle of the power rollers precisely by a simple construction.

In order to achieve the above objects, this invention provides a detecting device of speed ratio of a vehicle. The vehicle is provided with a toroidal continuously variable transmission joined to an engine and an ignition switch for starting operation of the engine. The detecting device comprises a sensor which detects that a speed ratio of the toroidal continuously variable transmission is smaller than a predetermined speed ratio range including a maximum speed ratio, and a microprocessor programmed to determine whether or not the ignition switch is in a starting position of the engine, and determine that the vehicle is starting under a small speed ratio, when the ignition switch is in a starting position of the engine and the speed ratio of the toroidal continuously variable transmission is smaller than the predetermined speed ratio range.

It is preferable that the vehicle is further provided with a warning device and the microprocessor is further programmed to turn on the warning device when it is determined that the vehicle is starting under a small speed ratio.

This invention also provides a control device for a toroidal continuously variable transmission joined to an engine of a vehicle. The vehicle is provided with an ignition switch for starting operation of the engine. The control device comprises a sensor which detects that a speed ratio of the toroidal continuously variable transmission is smaller than a predetermined speed ratio range including a maximum speed ratio, and a microprocessor programmed to determine whether or not the ignition switch is in a starting position of the engine. and control the speed ratio of the toroidal continuously variable transmission to gradually vary towards a predetermined target speed ratio when the ignition switch is in the starting position and the speed ratio is smaller than the predetermined speed ratio range.

The details as well as other features and advantages of this invention are set forth in the remainder of the specification and are shown in the accompanying drawings.

DESCRIPTION OF THE PREFERRED EMBODIMENTS

Figure 1:
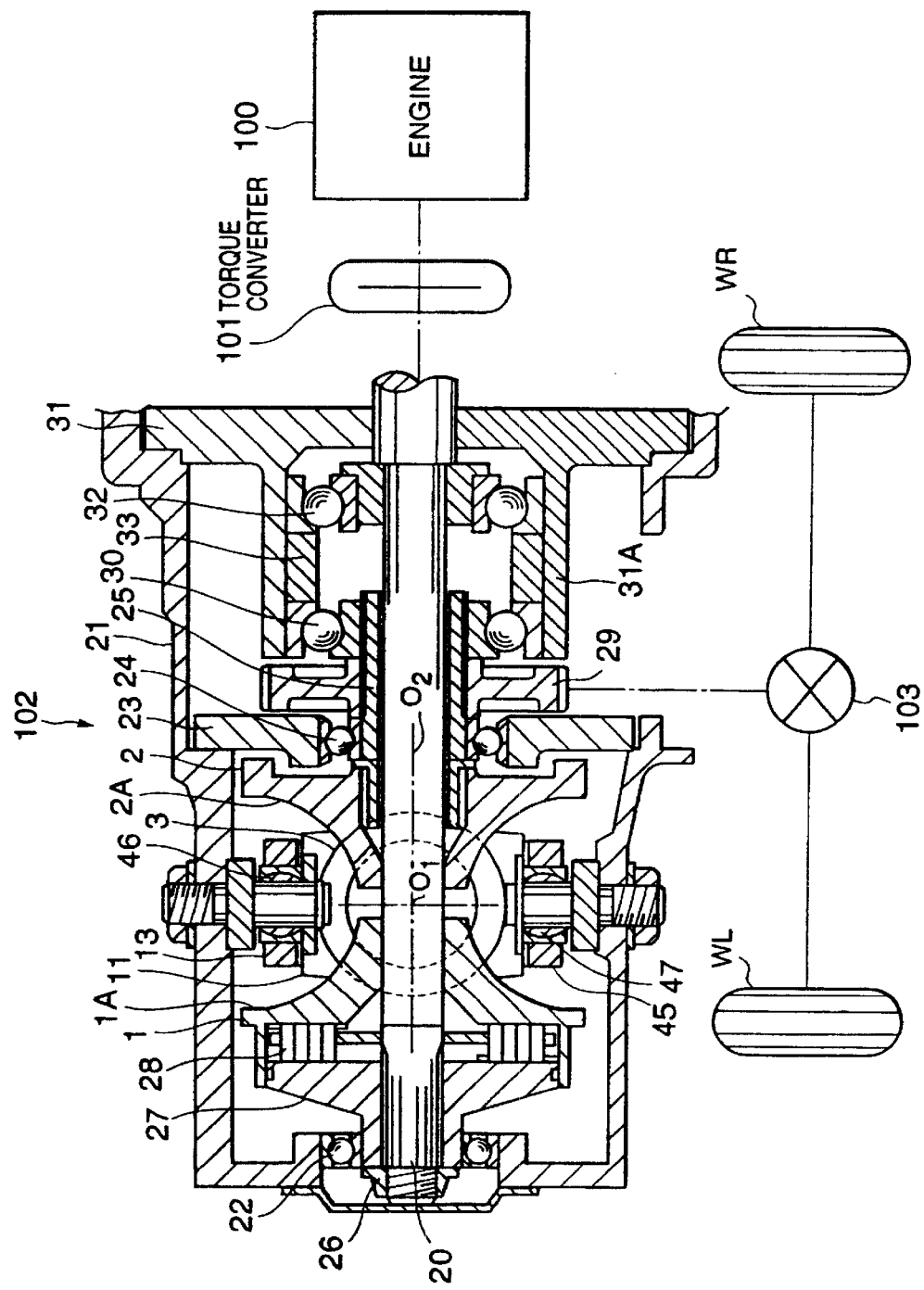
FIG. 1 is a longitudinal cross-sectional view of a toroidal continuously variable transmission to which this invention is applied.

Referring to FIG. 1 of the drawings, the rotation of an engine 100 is input to an input shaft 20 of a toroidal continuously variable transmission (hereafter abbreviated as CVT) 102 via a torque converter 101.

The CVT 102 is provided with a cam flange 27 screwed into the tip of the input shaft 20.

A nut 26 is also tightened on the tip of the input shaft 20, and the cam flange 27 is thereby fixed to the input shaft 20.

A cylindrical rear part of an input disk 1 fits on the outer circumference of the cam flange 27.

The input shaft 20 penetrates the central part of the input disk 1 with a small clearance, and the input disk 1 is held coaxial with the rotation shaft 20. The cam flange 27 is supported by a case 21 via a bearing 22. An end of the input shaft is also supported by the bearing 22 via the cam flange 27. Another end of the input shaft 20 is supported by an angular bearing 32.

Cam rollers 28 are disposed between the cam flange 27 and the input disk 1. The cam rollers 28 have a cam surface which pushes the input disk 1 to the right of the figure according to the relative rotational displacement of the cam flange 27 and the input disk 1.

An output disk 2 is supported on the circumference of the input shaft 20 such that it is free to rotate relative to the input disk 1.

Figure 2:
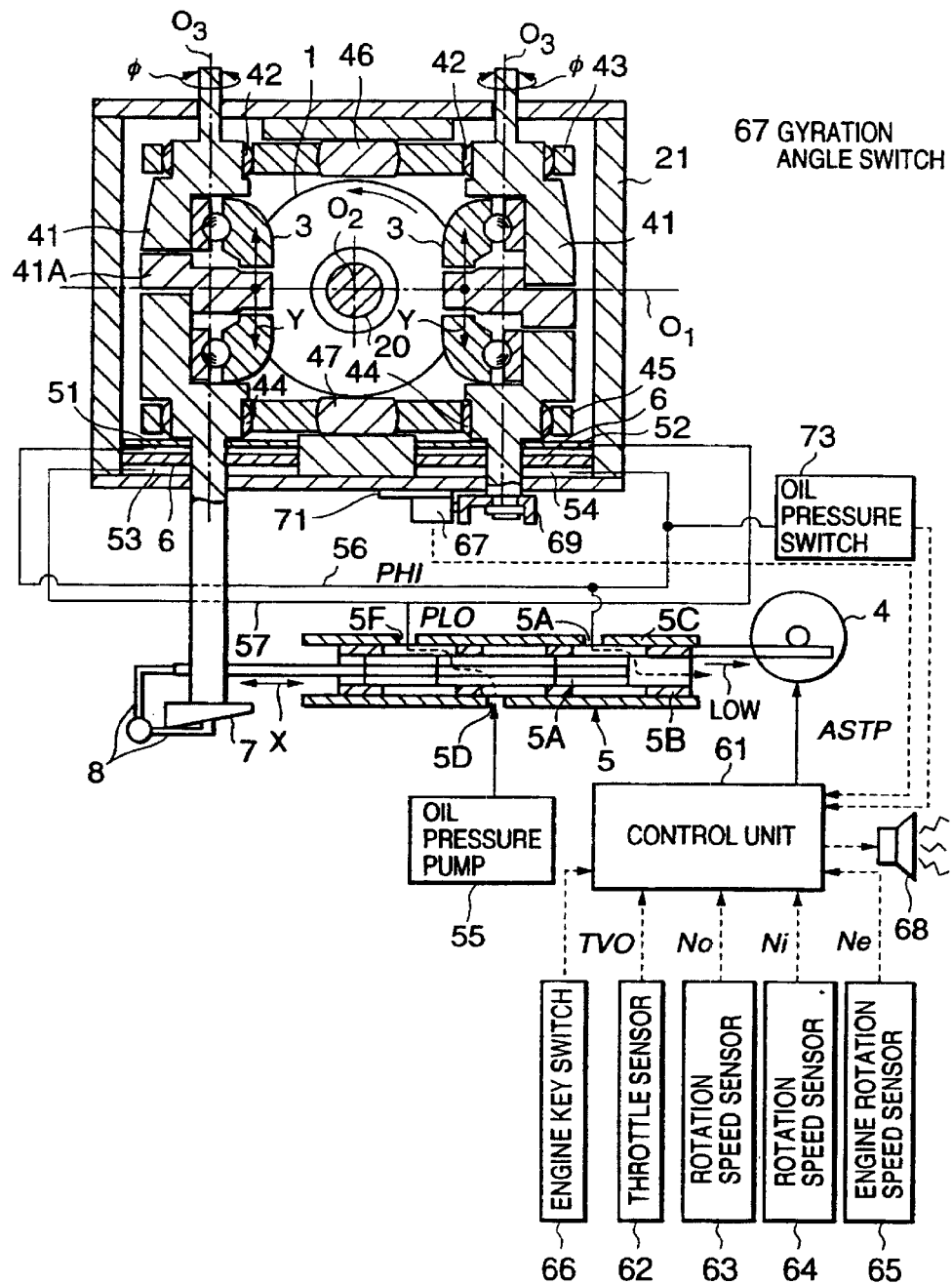
FIG. 2 is a schematic diagram of a control device of the toroidal continuously variable transmission according to this invention.

The input disk 1 and the output disk 2 have toroid curved surfaces 1A, 2A which face each other. A pair of power rollers 3 shown in FIG. 2 are gripped by these curved surfaces 1A, 2A.

The output disk 2 is spline jointed to a sleeve 25 supported on the circumference of the rotation shaft 20 via a needle bearing. The sleeve 25 is supported by an intermediate wall 23 of the case 21 via a radial bearing 24. It is also supported by an angular bearing 30. The angular bearings 30, 32 fit on an inside part 31A of a cover 31 fixed to the case 21. A spacer 33 is fitted between the angular bearings 30 and 32.

A leftward thrust force in the figure which the input disk 1 exerts on the input shaft 20 via the cam rollers 28, and a rightward thrust force in the figure which the output disk 2 exerts on the sleeve 25, are therefore canceled out mutually by the angular bearings 30, 32 and the spacer 33 gripped between them.

A load in a radial direction which acts on the angular bearings 30, 32 is supported by the cover 31.

An output gear 29 is spline-jointed to the outer circumference of the sleeve 25. The rotation of the output gear 29 is transmitted to driving wheels WR, WL of the vehicle via a differential 103. Between the output gear 29 and differential 103 a set of gears is interposed, but it is omitted in the figure.

The power rollers 3 are supported by trunnions 41. By driving the trunnions 41 in a perpendicular direction to the input shaft 20, the power roller 3 is made to vary its contact point with the input disk 1 and output disk 2.

Due to the force which these disks 1, 2 exert on the power roller 3 as a result, the trunnion 41 undergoes a rotational displacement around an axis $O_3$ in FIG. 2 as fulcrum, and the gyration angle of the power roller 3 changes.

Consequently, the distance of the contact point of the power roller 3 and input disk 1 from the input shaft 20, and the distance of the contact point of the power roller 3 and output disk 2 from the input shaft 20, vary respectively, and the speed ratio of the CVT 102 varies accordingly.

The trunnions 41 support the power rollers 3 free to rotate via a shaft 41A bent into a crank shape, as shown in FIG. 2.

They are also supported free to pivot within a small range around a base end of the shaft 41A.

The upper end of each of the trunnions 41 is joined to an upper link 43 via a spherical joint 42, and the lower end is joined to a lower link 45 via a spherical joint 44.

Further, the upper link 43 and the lower link 45 are supported by the case 21 via spherical joints 46 and 47, respectively.

Due to these links, the displacements of the pair of trunnions 41 in the direction of the axis $O_3$ are always mutually opposite. and their displacement distances are also equal.

A piston 6 is fixed to each of these trunnions 41, respectively.

The piston 6 causes the -trunnion 41 to displace along the axis $O_3$ according to the oil pressure balance of oil chambers 51, 53 and the oil pressure balance of oil chambers 52, 54.

Oil pressure is supplied to these oil chambers 51, 52, 53, 54 from an oil pressure control valve 5. The oil pressure control valve 5 comprises an outer sleeve 5C, inner sleeve 5B, and a spool 5A which slides on the inside of the inner sleeve 5B.

A port 5D connected to an oil pressure pump 55, a port 5E and a port 5F are formed in the outer sleeve 5C, respectively. The port 5E communicates with the oil chambers 51, 54 via a shift-up passage 56, and the port 5F communicates with the oil chambers 52, 53 via a shift-down passage 57.

The inner sleeve 5B is connected with a step motor 4 via a rack and a pinion. Openings at the ends of the inner sleeve 5B communicate respectively with a drain passage, not shown. The spool 5A is joined to a link 8.

The link 8 displaces the spool 5A according to the rotational displacement of a precess cam 7 fixed to the lower end of one of the trunnions 41 around the axis $O_3$ and its displacement in the direction of the axis $O_3$. Due to this action of the precess cam 7 and link 8, the gyration angle of the power roller 3 is mechanically fed back to the oil pressure control valve 5.

The oil pressure control valve 5 varies the supply pressure to the ports 5E and 5F, according to a step number ASTP output from a control unit 61 to the step motor 4.

For example, when the spool SA and outer sleeve SC are in the positions shown in FIG. 2 as a result of the displacement of the inner sleeve 5B driven by the step motor towards the right of the figure, high pressure oil from the oil pressure pump 55 is supplied to the oil chambers 52, 53 via the downshift passage 57 from the port 5F, and oil in the oil chambers 51, 54 is drained via the shift-up passage 56 and port 5E.

Consequently, the trunnion 41 on the left of the figure displaces upwards along the axis $O_3$, and the trunnion 41 on the right of the figure displaces downwards along the axis $O_3$.

In other words, the rotation axis $O_1$ of the power roller 3 displaces from a neutral position where the rotation axes $O_1$ and $O_2$ intersect, in a direction shown by the arrow Y in the figure.

Due to this displacement, the input disk 1 and output disk 2 cause the power rollers to gyrate around the axes $O_3$ in the figure in the increasing direction of the speed ratio.

The displacement amount of the trunnion 41 in the direction of the axis $O_3$ and the rotational displacement amount of the trunnion 41 around the axis $O_3$ accompanying this action, are fed back to the oil pressure control valve 5 via the precess cam 7 fixed to lower end of one of the trunnions 41 and the link 8, and the spool 5A therefore displaces leftward along the arrow X in the figure. Due to this feedback action, when a speed ratio corresponding to the step number ASTP is attained, the spool 5A resets to a neutral position relative to the inner sleeve 5B at which there is no inflow and outflow of oil to and from any of the oil chambers.

In this way, each of the trunnions 41 is held in a displaced state in the direction of the axis $O_3$.

On the other hand, the power rollers which respectively performed a rotational displacement around the axes $O_3$ then pivot around the base end of the shaft 41A so as to return to the neutral position at which the axes $O_1$ and $O_2$ intersect.

On the other hand, if the step motor 4 displaces the inner sleeve 5B to the left of the figure, so that the high pressure oil of the oil pressure pump 55 communicates with the port 5E and the drain communicates with the port 5D, the oil chambers 51, 54 are highly pressurized, and the oil chambers 52, 53 are discharged to the drain.

In this case, the rotation axis $O_1$ of the power roller 3 on the right-hand side of the figure displaces upward and the rotation shaft $O_1$ of the power roller 3 on the left-hand side of the figure displaces downward.

Consequently, the input disk 1 and output disk 2 gyrate the power rollers 3 around the axes $O_3$ in the figure. Due to this action, the displacement amount of the trunnion 41 in the direction of the axis $O_3$ and the rotational displacement of the power roller 3 around the axis $O_3$ are fed back to the oil pressure control valve 5 via the precess cam 7 and link 8, and the spool 5A undergoes a displacement rightward along the arrow X in the figure.

Due to this feedback action, when the speed ratio corresponding to the above-mentioned step number ASTP is attained, the spool SA resets to the neutral position.

In this way, the trunnions 41 are held in a state where they are displaced in the direction of the axis $O_3$, but the power rollers 3 return to the neutral position while maintaining a new gyration angle.

The reason why the precess cam 7 feeds back not only the rotational displacement amount of the power roller 3 around the axis $O_3$, i.e., the gyration angle, but also the displacement amount of the trunnion 41 in the direction of the axis $O_3$, is to prevent the speed change control result from oscillating by giving a damping effect to the control.

The step number ASTP is determined in the control unit 61.

The control unit 61 comprises a microcomputer equipped with a central processing unit, read-only memory (ROM), random access memory (RAM) and I/O interface.

Signals are input to the control unit 61 according to detection items or control items respectively from a throttle sensor 62 which detects a throttle opening TVO of the engine, a rotation speed sensor 63 which detects a rotation speed No of the output disk 2, a rotation speed sensor 64 which detects a rotation speed Ni of the input disk 1, an engine rotation speed sensor 65 which detects a rotation speed Ne of the engine 100, an engine key switch 66 having the function of an ignition switch to start the engine 100 and the function of locking and unlocking a steering wheel of the vehicle, an oil pressure switch which outputs an ON signal when a pressure PHI of the shift-up passage 56 is not less than a predetermined pressure, and a gyration angle switch 67 which outputs an ON signal when the gyration angle phi of the power roller 3 is not less than a predetermined angle.

The control unit 61 normally performs speed ratio control of the CVT 102 as follows based on these input signals. First, the rotation speed No of the output disk 2 is multiplied by a constant to calculate the running speed of the vehicle. A target transmission input rotation speed is calculated by looking up a prestored speed ratio map based on the running speed and the throttle opening TVO.

A target speed ratio is calculated by dividing the target transmission input rotation speed by the output speed No.

The step number ASTP corresponding to the target speed ratio is then output to the step motor 4.

On the other hand, if the vehicle starts under a small speed ratio as mentioned above, the vehicle may not start smoothly due to the sudden change of speed ratio or the sudden change of transmission torque.

Figure 3:
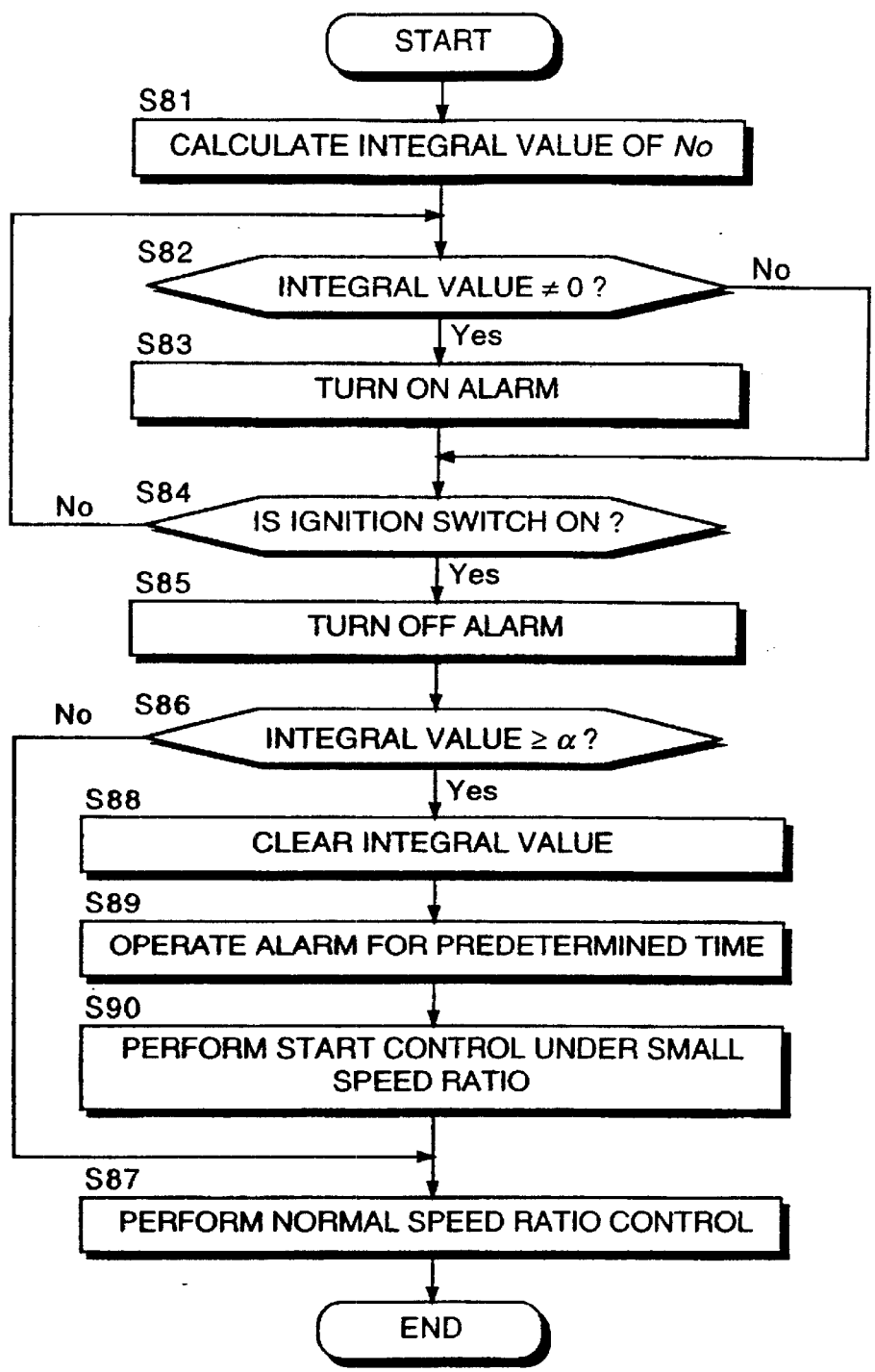
FIG. 3 is a flowchart describing a speed ratio control routine performed by a control unit according to this invention.
Figure 4:
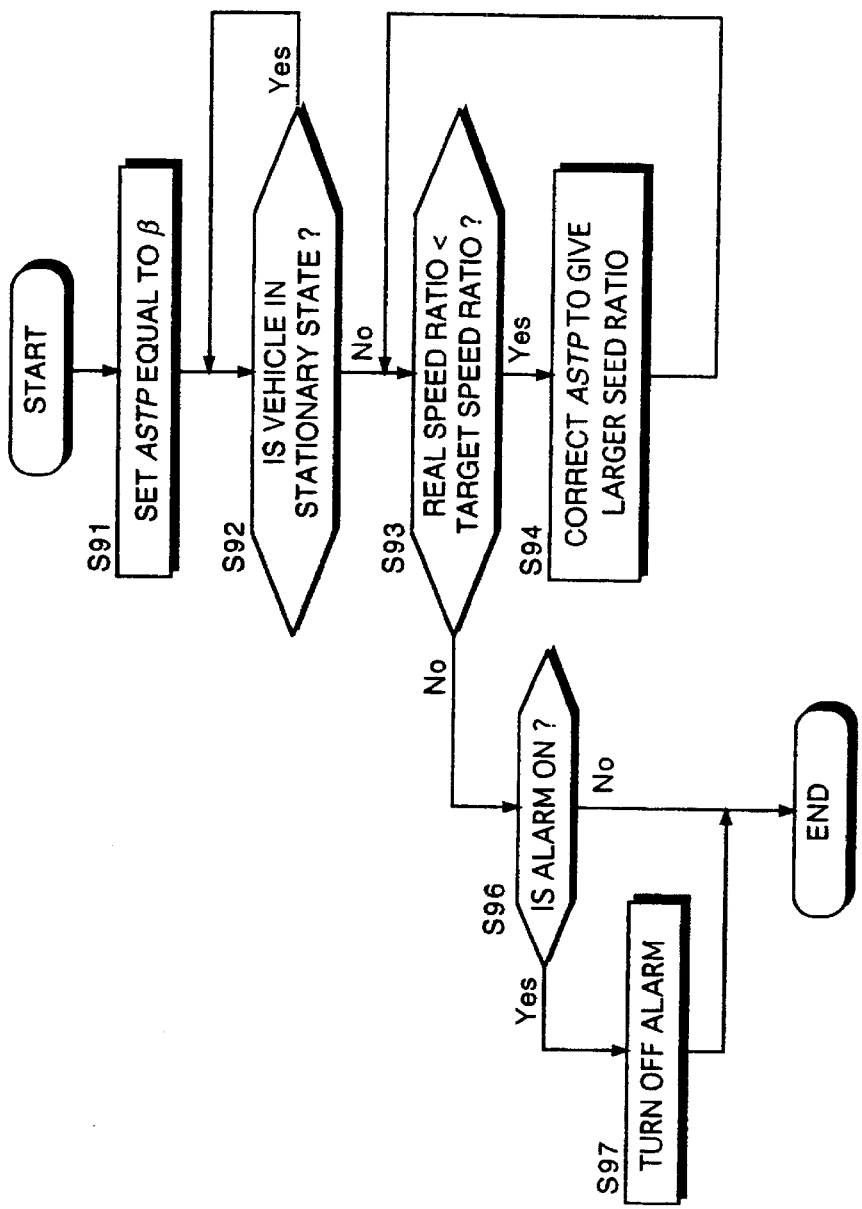
FIG. 4 is a flowchart describing a speed ratio control subroutine when a vehicle starts under a small speed ratio performed by the control unit.

The control unit 61 therefore performs the routine shown in FIGS. 3 and 4.

When the vehicle attempts to start under a small speed ratio in these routines, the control unit 61 operates an alarm 68 with which the vehicle is equipped, and makes the vehicle start smoothly by performing special speed ratio control.

The routine of FIG. 3 explains a process performed by the control unit 61 from when the ignition key switch 66 releases the steering lock of the vehicle to when running of the vehicle is terminated.

First, in a step S81, the control unit 61 integrates the rotation speed No of the output disk 2.

In a step S82, it is determined whether or not the integral value integrated in the step S81 is 0.

When the integral value is not 0, the alarm 68 is operated in a step S83, and the routine proceeds to a step S84.

When the integral value is 0, the routine proceeds directly to the step S84.

In the step S84, it is determined whether or not the ignition switch is ON from the output signal of the engine key switch 66.

When the ignition switch is ON, the routine proceeds to a following step S85.

When the ignition switch is OFF. the routine repeats the processing of the steps S81–S84.

The significance of the steps S81–S84 will now be described.

First, when the integral value of the rotation speed No of the output disk 2 is 0, it shows that the vehicle is not running.

On the other hand, when the ignition switch is OFF and the integral value is not 0, it shows that the vehicle was running with the engine 100 in the stationary state.

This corresponds, for example, to the case where the vehicle goes down a slope due to an action of gravity, or the vehicle is towed.

Therefore, summarizing the steps S81–S84, when it is determined that the vehicle was running with the engine 100 in the stationary state, an alarm is emitted in advance of the start of the engine 100.

Now, if the ignition switch changes to ON, the routine proceeds to the step S85.

Here, the alarm 68 is turned OFF. That is, even if the alarm 68 was ON due to the processing of the steps S81–S84, the alarm 68 is turned OFF simultaneously with the startup of the engine 100.

In a following step S86, it is determined whether or not the integral value of the rotation speed No of the output disk 2 calculated in the step S81 is not less than a predetermined value alpha.

When the integral value is less than the predetermined value alpha, the routine skips steps S88–S90 and performs normal speed ratio control in a step S87 until the operation of the vehicle is terminated.

On the other hand, when the integral value is not less than the predetermined value alpha, the routine proceeds to the step S88.

In the step S88, the integral value integrated in the step S81 is cleared to 0 in preparation for the next vehicle start, i.e., the next occasion when the routine is executed. In the next step S89, the alarm 68 is operated for a predetermined time.

In the next step S90, start control under a small speed ratio is performed by the subroutine of FIG. 4.

After terminating start control under a small speed ratio, the routine proceeds to the step S87 and shifts to normal speed change control.

The integral value of the rotation speed No of the output disk 2 corresponds to the running distance of the vehicle.

The predetermined value alpha is set to. for example, 0.5 meters.

This is based on the fact that, after the engine key switch 66 releases the steering lock, the speed ratio of the CVT 102 is changing to a small value while the running distance of the vehicle reaches 0.5 meters in the state where the engine 100 is not operating.

The integral value is compared with the predetermined value alpha for determining whether or not the CVT 102 has changed to a small speed ratio.

In this routine, although the alarm is emitted twice in the steps S83 and S89, the alarm emitted in the step S83 is an alarm which shows that the vehicle was running while the engine is stopped, and that there is a possibility that the vehicle will start under a small speed ratio.

On the other hand, the alarm emitted in the step S89 is intended to inform the driver that the vehicle is certainly starting under a small speed ratio.

Next, a subroutine for start control under a small speed ratio performed in the step S90 will be described referring to FIG. 4.

First, in a step S91, the control unit 61 sets the step number ASTP output to the step motor 4 to a value β corresponding to a speed ratio smaller than the maximum speed ratio of the CVT 102. The target speed ratio during normal start corresponds to the maximum speed ratio, therefore, the step number ASTP output to the step motor 4 from the control unit 61 during start of the vehicle also corresponds to the maximum speed ratio. In the step S91, however, the step number β corresponding to the small speed ratio is output to the step motor 4. If the step number corresponding to the maximum speed ratio is output to the step motor 4 from the beginning, the speed ratio will change suddenly from a small speed ratio to the maximum speed ratio in a short time.

As a result, the vehicle may start abruptly due to a rapid rise of driving torque, and this may confuse the driver.

To avoid this situation, the step number β corresponding to a speed ratio smaller than the maximum speed ratio is therefore given to the step motor 4 here when the subroutine is initially executed.

In a next step S92, it is determined whether or not the vehicle is in a stationary state.

Here, it is determined that the vehicle is in the stationary state when the vehicle speed calculated from the rotation speed No of the output disk 2 is less than a predetermined value, for example, 6 km/hr.

When it is determined that the vehicle is in the stationary state, the subroutine does not proceed to future steps, and the determination of the step S92 is repeated at a predetermined interval until it is determined that the vehicle is not in the stationary state.

The predetermined value may be set to the minimum value of the rotation speed of the output disk 2 which the rotation speed sensor 63 can detect.

When the vehicle speed is less than the predetermined value, the real speed ratio cannot be calculated, and as data required for execution of subsequent steps cannot be obtained, the routine does not proceed further than the step S92 until data are obtained.

When it is determined that the vehicle is not in the stationary state in the step S92, the subroutine proceeds to a step S93.

Here, it is determined whether or not the real speed ratio is less than the target speed ratio which is equal to or in the vicinity of the maximum speed ratio.

The real speed ratio is calculated as the ratio of the rotation speed Ni of the input disk 1, and the rotation speed No of the output disk 2.

When the real speed ratio is less than the target speed ratio, in a step S94, the step number ASTP is corrected to a value corresponding to a speed ratio larger than β.

Subsequently, the determination of the step S93 is performed again.

If the real speed ratio is still less than the target speed ratio, the step number ASTP is set to a value corresponding to a still larger speed ratio in a step S94.

In this way, the real speed ratio is gradually made to approach the target speed ratio by progressively changing the step number ASTP to a value corresponding to a larger speed ratio.

This process may be understood more easily by imagining the shift positions of the conventional transmission.

Imagine the case where the speed ratio when the vehicle is to start corresponds to fifth gear, and the target speed ratio correspond to first gear. In the step S91, the value β corresponding to fourth gear is set as the step number ASTP.

As the step number corresponds to fourth gear, in the determination of the step S93 performed after startup of the vehicle, the real speed ratio has of course not yet reached first gear.

Therefore, the step number ASTP is set to a value corresponding to third gear in the step S94.

Next, when the processing of the step S94 is performed, the step number ASTP is set to a value corresponding to second gear, and when the processing of the step S94 is next performed, the step number ASTP is set to a value corresponding to first gear.

Thus, the real speed ratio is made to vary gradually towards the target speed ratio by varying the step number in stages to a target speed ratio equivalent value.

When it is determined that the real speed ratio is not less than the target speed ratio in the step S93, it signifies that the real speed ratio has reached the target speed ratio.

In this case, it is considered that speed ratio control for starting the vehicle under a small speed ratio has terminated, and in a step S96, the subroutine determines whether or not the alarm 68 is operating.

If the alarm 68 is not operating, the subroutine is terminated, and if the alarm 68 is operating, the subroutine is terminated after stopping operation of the alarm 68 in a step S97.

Referring again to FIG. 3. in the step S89, the alarm 68 is operated for the predetermined time, so the alarm 68 may continue operating until the predetermined time is reached even after the determination in the step S93 that speed ratio control for vehicle startup under a small speed ratio has terminated.

Therefore, when speed ratio control for startup under a small speed ratio is terminated and the alarm 68 is still operating, the alarm 68 is turned OFF in a step 97.

It is also possible to omit either the operation of the alarm 68 in the step 89 or the speed ratio control for startup under a small speed ratio of the step S90, i.e., the subroutine of FIG. 4.

Even if the step S89 is omitted, for example, the alarm 68 operates in the step S83, so the driver can anticipate that startup control under a small speed ratio will be performed.

As speed ratio control for startup under a small speed ratio is performed by the step S90 as required, it may be omitted to operate the alarm 68 again in the step S89.

On the other hand, if the step S90 is omitted, the driver can still recognize the fact that the CVT 2 has a small speed ratio unsuitable for vehicle startup due to the alarm 68 operating in the step S89.

In this situation, if the vehicle is on a steep hill road, it may not be able to start with a small speed ratio.

Even in such a case, the driver, who is informed of the small speed ratio by the alarm 68, can first reverse the vehicle in order to reset the speed ratio of the CVT 102 to the maximum speed ratio. That is, if the driver is warned that the vehicle will startup under a small speed ratio, the driver can reset the speed ratio to the maximum speed ratio by reversing the vehicle for a small distance and then proceed with forward running under the maximum speed ratio.

In this embodiment, in the step S86, it is determined whether or not the speed ratio of the CVT 2 is a small speed ratio by determining whether or not the integral value of the rotation speed No of the output disk 2 is not less than the predetermined value a.

However, the determination of whether or not the speed ratio of the CVT 2 is a small speed ratio can be made by another method as shown below.

When the speed ratio of the CVT 2 is small, the oil pressure PHI of the shift-up passage 56 during engine startup is low.

Therefore, if the signal input to the control unit 61 from the oil pressure switch 73 shown in FIG. 2 is OFF at the time of engine startup, it can be determined that the CVT 2 has a small speed ratio.

The reason why the shift-up oil pressure PHI is low when the vehicle starts under a small speed ratio is as follows.

During normal vehicle startup, the speed ratio of the CVT 2 is the maximum speed ratio, and the step number ASTP which the control unit 61 outputs to the step motor 4 after starting is a value corresponding to a speed ratio less than the maximum speed ratio.

That is, the shift-up of the CVT 2 begins when the vehicle starts.

In order to perform this shift-up operation, the step motor 4 displaces the inner sleeve 5B of the oil pressure control valve 5 to the left of FIG. 2, supplies the discharge pressure of the oil pressure pump 55 to the shift-up passage 56, and thereby raises the oil pressure PHI.

The downshift passage 57 is also connected to the drain, and the downshift oil pressure PLO is reduced.

On the other hand, as a downshift Is required immediately after vehicle startup when starting under a small speed ratio, the speed ratio to which the step number ASTP output by the control unit 61 to the step motor 4 corresponds, is a larger speed ratio than the real speed ratio of the CVT 2. As a result, the step motor 4 displaces the inner sleeve 5B of the oil pressure control valve 5 to the right of FIG. 2, reduces the oil pressure PHI of the shift-up passage 56, and raises an oil pressure PLO of the downshift passage 56.

Therefore, if the input signal from the oil pressure switch 73 to the control unit 61 is OFF which shows that the shift-up oil pressure PHI is less than the predetermined pressure, it can be considered that the vehicle is starting under a small speed ratio.

Figure 5:
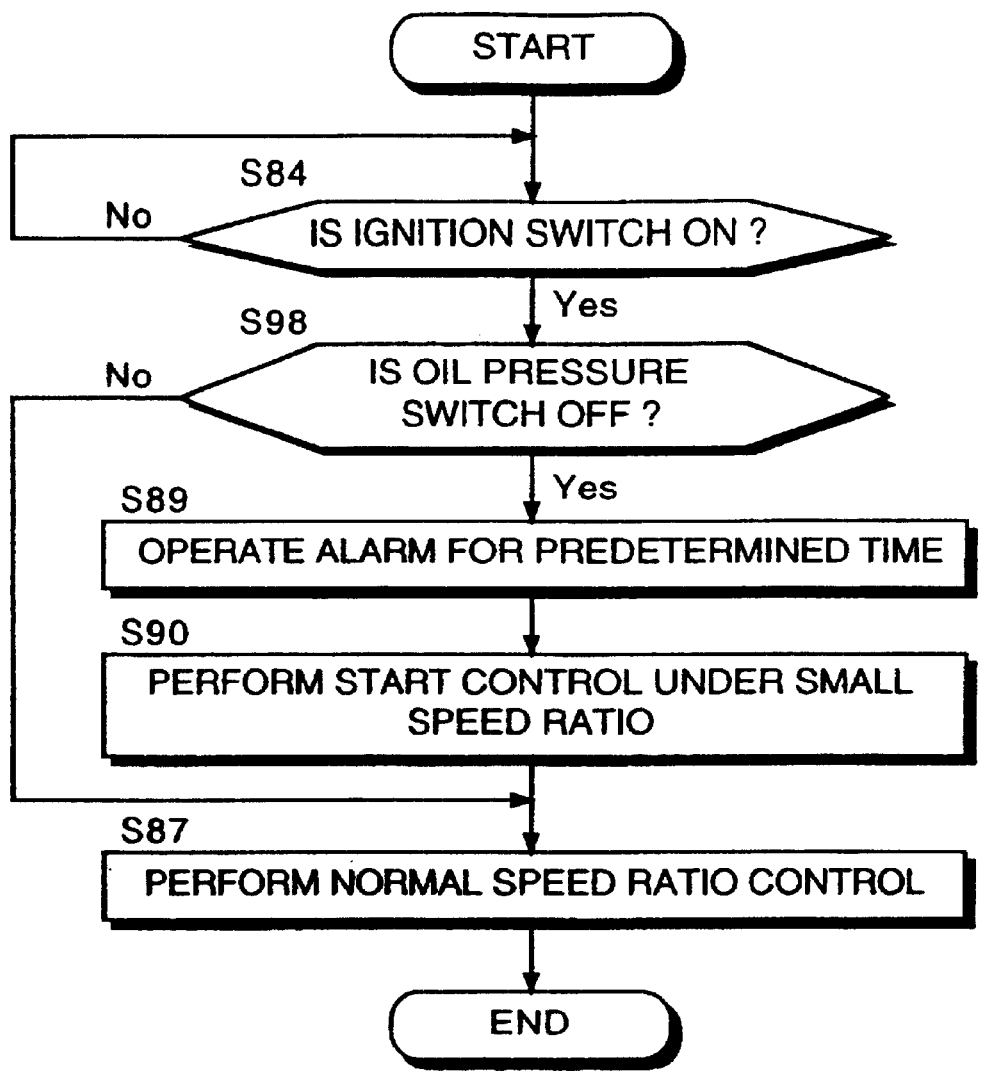
FIG. 5 is a flowchart describing a speed ratio control routine according to a second embodiment of this invention.

Next, a second embodiment of this invention based on the above logic will be described referring to the flowchart of FIG. 5.

This flowchart is applied instead of the flowchart of FIG. 3 of the first embodiment to implement the above logic with respect to the determination of a small speed ratio.

The same numbers are given to steps which perform the same processing as that of FIG. 3.

The control unit 61 first determines whether or not the ignition switch is ON from the output signal of the engine key switch 66 in a step S84.

When the ignition switch is OFF, the routine waits without proceeding to future steps until it is turned ON. When the ignition switch is ON, in a step S98, the routine determines whether or not the input signal from the oil pressure switch 73 is OFF.

When the input signal from the oil pressure switch 73 is OFF, it shows that the shift-up oil pressure PHI is low. In this case, the alarm 68 is operated for the predetermined time in the step S89.

Further, after performing the subroutine shown in FIG. 4 in the step S90, the routine shifts to the normal speed ratio control of the step S87, and normal speed ratio control is continued until operation of the vehicle stops. On the other hand, when the input signal from the oil pressure switch 73 is ON, normal speed ratio control of the step S87 is started immediately and continues until operation of the vehicle stops.

By using the oil pressure switch 73 as in this embodiment, it can be simply and economically determined whether the vehicle is starting under a small speed ratio. This determination can also be performed in advance of startup of the engine 100.

Instead of being based on the pressure of the shift-up passage 56, the determination of whether or not the vehicle is starting under a small speed ratio can be based on the gyration angle phi of the power roller 3 detected by the gyration angle switch 67.

A third embodiment of this invention using the signal of the gyration angle switch 67 will now be described referring to FIGS. 6 and 7.

Figure 6:
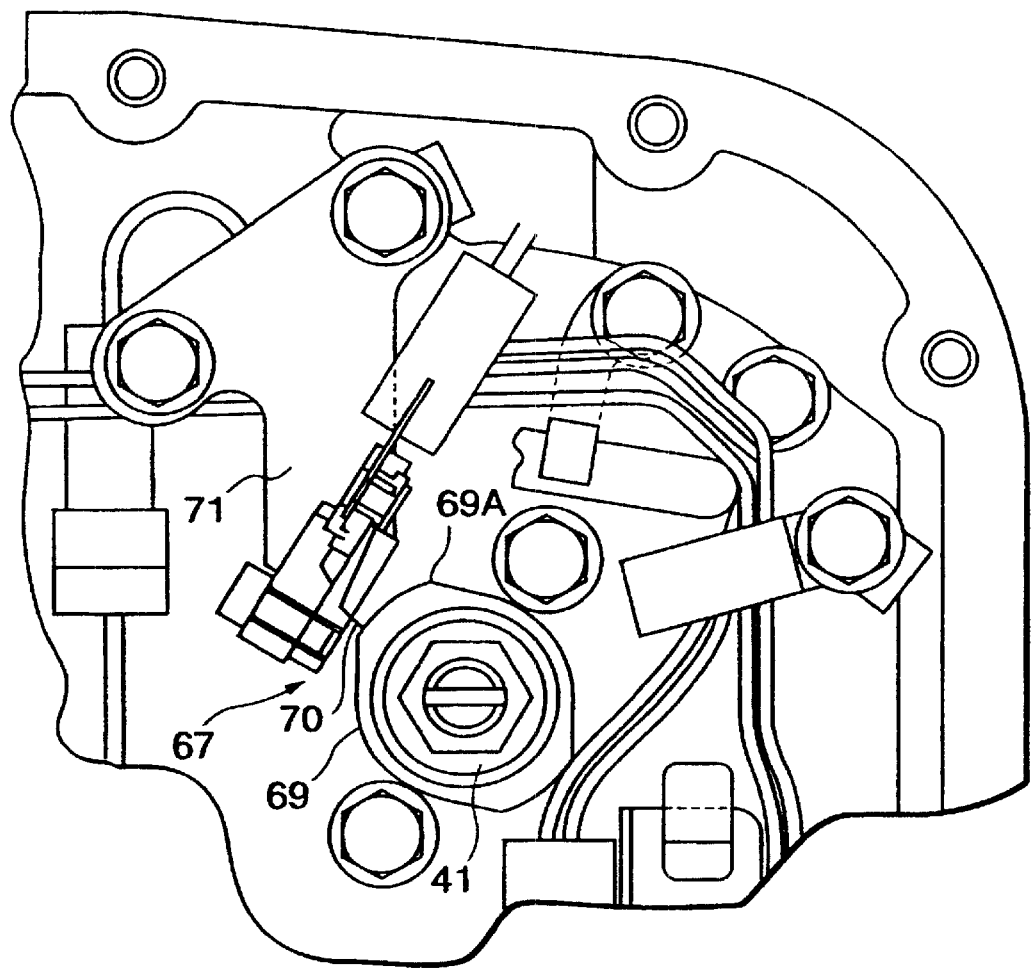
FIG. 6 is a longitudinal cross-sectional view of essential parts of a toroidal continuously variable transmission equipped with a gyration angle switch according to a third embodiment of this invention.

The gyration angle switch 67 is provided with a cam 69 fixed to the base end of the trunnion 41, and a contact point 70 supported in the case 21 via a bracket 71, as shown in FIG. 6. A large diameter part 69A is formed in the cam 69, and when the cam 69 is in a predetermined rotation angular range corresponding to a predetermined gyration angle range of the power roller 3, the large diameter part 69A pushes the contact point 70 and the gyration angle switch 67 switches ON to output a signal current to the control unit 61. On the other hand, when the cam 69 is not in the predetermined rotation angular range, the large diameter part 69A separates from the contact point 70, and the gyration angle switch 67 is electrically insulated.

Herein, if it the predetermined gyration angular range of the power roller 3 is set to correspond to a small speed ratio, it can be detected that the CVT 2 is running under a small speed ratio by the input signal to the control unit 61 from the gyration angle switch 67.

Figure 7:
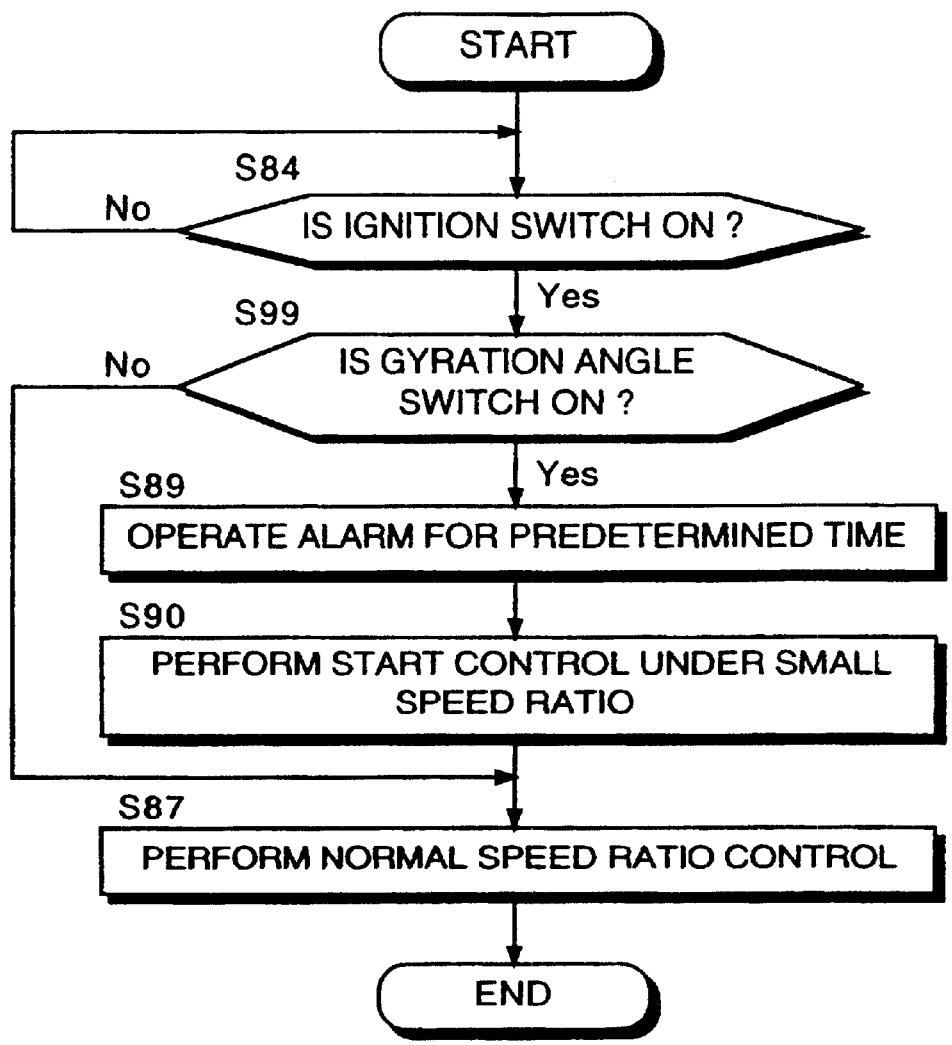
FIG. 7 is a flowchart describing a speed ratio control routine according to the third embodiment of this invention.

Instead of the step S98 of the second embodiment, the control unit 61 determines whether or not the CVT is running under a small speed ratio by the step S99 which determines whether or not the signal from the gyration angle switch 67 is ON, as shown in FIG. 7.

Also in this embodiment, it can be simply and economically determined whether or not the vehicle is starting under a small speed ratio.

This determination can also be performed in advance of the startup of the engine 100.

In the gyration angle switch 67 of this embodiment, the contact point 70 is in a free state wherein it is not in contact with the cam 69.

Such a construction may introduce scatter in the relation between the contact pressure of the contact point 70 and cam 69 required to switch the output signal of the gyration angle switch 67 ON, and the rotation angle of the cam 69.

That is, the construction does not guarantee that the signal of the gyration angle switch 67 will switch ON at a preset gyration angle of the power roller 3.

Figure 8:
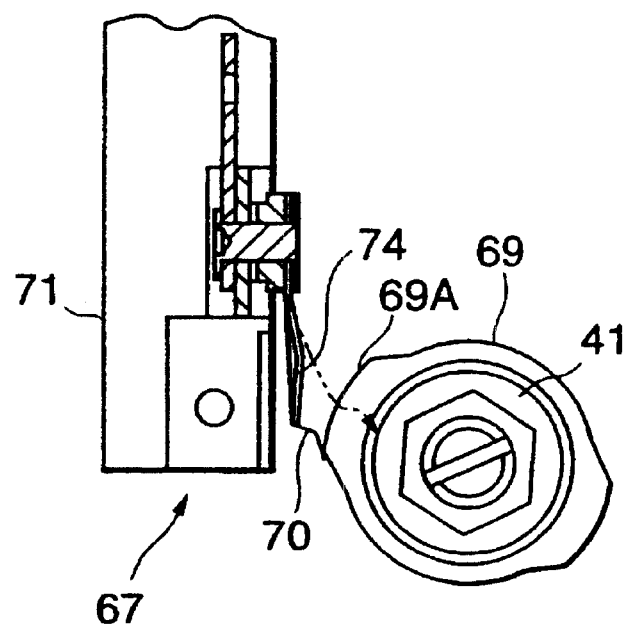
FIG. 8 is a longitudinal cross-sectional view of a gyration angle switch in operation according to a fourth embodiment of this invention.

Next, a fourth embodiment of this invention which improves this point will be described referring to FIG. 8.

In this embodiment, the initial position of the contact point 70 of the gyration angle switch 67 shifts from the free state shown by the dot-and-dash line to the solid line in the figure using a pressing plate 74. That is, a preload is exerted by the contact point 70 due to the pressing plate 74.

If the gyration angle switch 67 is formed in this way, as soon as the cam 69 touches the contact point 70, the pressing plate 74 will separate from the contact point 70. As a result, the reaction force of the preload which the contact point 70 was exerting on the pressing plate 74, acts directly on the cam 69, and a contact pressure corresponding to the preload is generated between the cam 69 and the contact point 70 from the moment of contact. Therefore, the gyration angle switch 67 outputs an ON signal from the moment of this contact without fail, and it can be detected that the CVT 2 is running under a small speed ratio with good accuracy.

Figure 9:
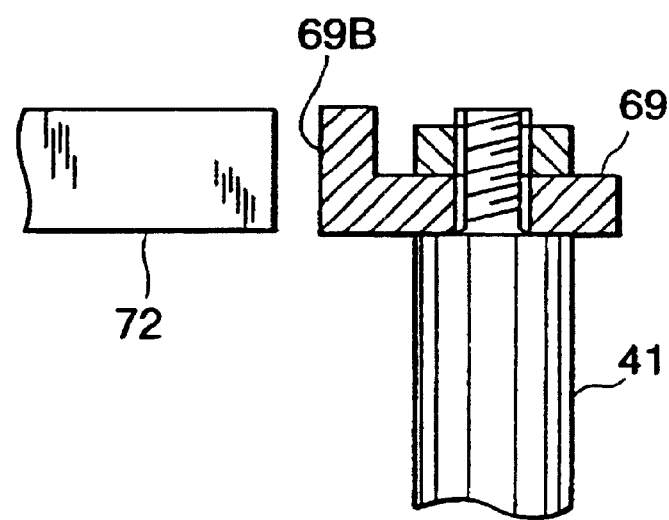
FIG. 9 is a cross-sectional view of essential parts of a gyration angle switch according to a fifth embodiment of this invention.
Figure 10:
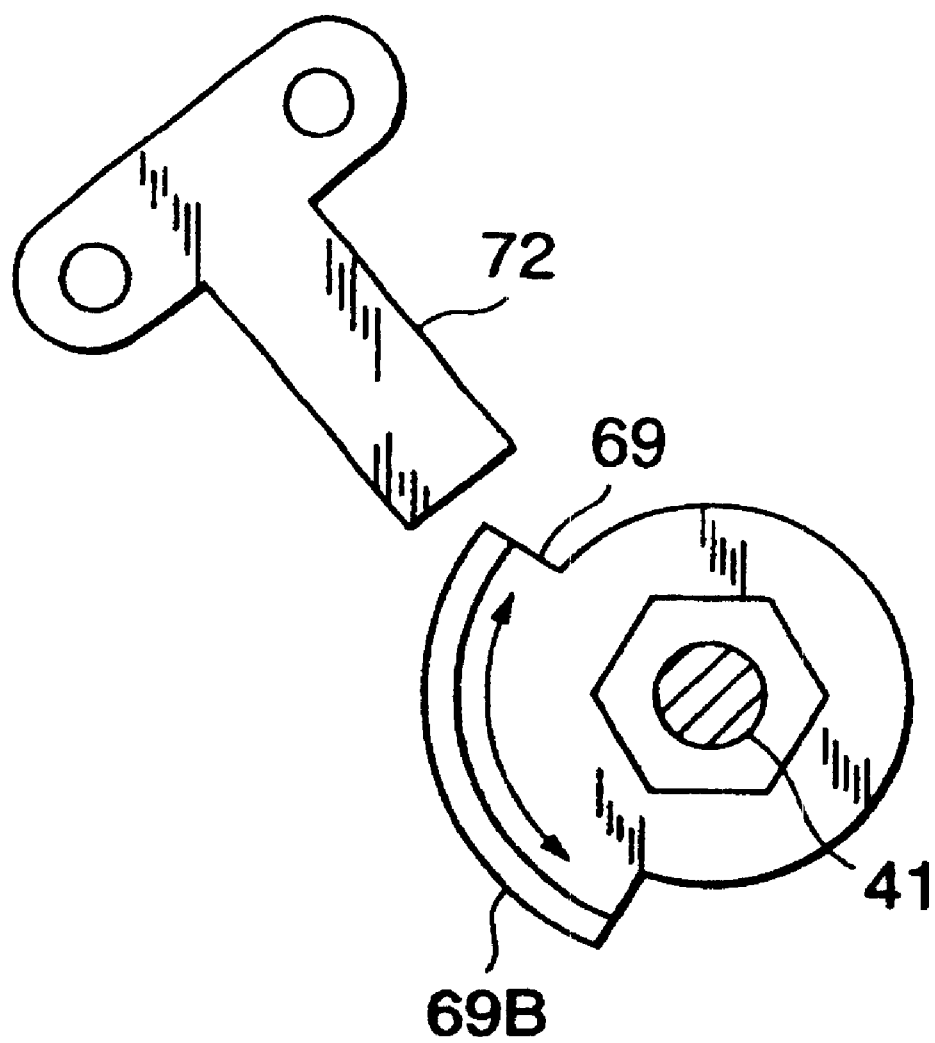
FIG. 10 is a plan view of the gyration angle switch according to the fifth embodiment of this invention.

Next, a fifth embodiment of this invention will be described referring to FIGS. 9 and 10.

In this embodiment, instead of forming the contact point 70 in the gyration angle switch 67, an electromagnetic pickup 72 is provided. A magnetic marker 69B which induces the reaction of the electromagnetic pickup 72 is provided in the cam 69. If the cam 69 itself is formed of a magnetic material, the large diameter part 69A shown in FIGS. 9 and 10 may be formed in the cam 69 as the magnetic marker 69B. According to this embodiment, the predetermined gyration angular range of the power roller 3 can be detected without a component in contact with the cam 69. Such a construction largely reduces the possibility of mechanical failure of the gyration angle switch 67.

The contents of Tokugan Hei 11-278663, with a filing date of Sep. 30, 1999 in Japan, are hereby incorporated by reference.

Although the invention has been described above by reference to certain embodiments of the invention. the invention is not limited to the embodiments described above. Modifications and variations of the embodiments described above will occur to those skilled in the art, in light of the above teachings.

For example, the alarm 68 is not necessarily of a sound generating device. It may be of a warning lamp or any other device generating a warning signal.

The embodiments of this invention in which an exclusive property or privilege is claimed are defined as follows:

What is claimed is:

1. A detecting device of speed ratio of a vehicle, the vehicle being provided with a toroidal continuously variable transmission joined to an engine and an ignition switch for starting operation of the engine, the detecting device comprising:

a sensor which detects that a speed ratio of the toroidal continuously variable transmission is smaller than a predetermined speed ratio range including a maximum speed ratio; and a microprocessor programmed to:

determine whether or not the ignition switch is in a starting position of the engine; and determine that the vehicle is starting under a small speed ratio, when the ignition switch is in a starting position of the engine and the speed ratio of the toroidal continuously variable transmission is smaller than the predetermined speed ratio range.

2. The detecting device as defined in claim 1, wherein the sensor comprises a sensor which detects an output rotation speed of the continuously variable transmission, and the microprocessor is further programmed to calculate an integral value of the output rotation speed before the ignition switch is in the starting position, and to determine that the speed ratio is smaller than the predetermined speed ratio range when the integral value exceeds a predetermined value.

3. The detecting device as defined in claim 2, wherein the microprocessor is further programmed to determine whether or not the integral value is zero, and control the alarm to operate before the ignition switch is in the starting position when the integral value is determined to be non-zero.

4. The detecting device as defined in claim 1, wherein the toroidal continuously variable transmission comprises a shift-up passage to transmit pressure for a shift-up operation, the sensor comprises a sensor which detects a pressure variation in the shift-up passage, and the microprocessor is further programmed to determine that the speed ratio is smaller than the predetermined speed ratio range when the pressure of the shift-up passage is lower than a predetermined pressure.

5. The detecting device as defined in claim 1, wherein the toroidal continuously variable transmission comprises a power roller which varies the speed ratio according to a gyration angle, the sensor comprises a sensor which detects a variation of the gyration angle, and the microprocessor is further programmed to determine that the speed ratio is smaller than the predetermined speed ratio range when the gyration angle is in a predetermined angular range.

6. The detecting device as defined in claim 5, wherein the gyration angle detecting sensor comprises a cam which rotates according to the gyration angle variation of the power roller, and a contact point which electrically conducts due to contact with the cam.

7. The detecting device as defined in claim 6, wherein the gyration angle detecting sensor further comprises a member which applies a preload on the contact point.

8. The detecting device as defined in claim 5, wherein the gyration angle detecting sensor comprises a magnetic marker which rotates according to the gyration angle variation of the power roller, and a magnetic pickup responsive to a rotational displacement of the magnetic marker.

9. The detecting device as defined in claim 1, wherein the vehicle is further provided with a warning device and the microprocessor is further programmed to turn on the warning device when it is determined that the vehicle is starting under a small speed ratio.

10. A detecting device of speed ratio of a vehicle, the vehicle being provided with a toroidal continuously variable transmission joined to an engine and an ignition switch for starting operation of the engine, the detecting device comprising:
   means for detecting that a speed ratio of the toroidal continuously variable transmission is smaller than a predetermined speed ratio range including a maximum speed ratio;
   means for determining whether or not the ignition switch is in a starting position of the engine; and
   means for determining that the vehicle is starting under a small speed ratio, when the ignition switch is in a starting position of the engine and the speed ratio of the toroidal continuously variable transmission is smaller than the predetermined speed ratio range.

11. A control device for a toroidal continuously variable transmission joined to an engine of a vehicle, the vehicle being provided with an ignition switch for starting operation of the engine, the control device comprising:
   a sensor which detects that a speed ratio of the toroidal continuously variable transmission is smaller than a predetermined speed ratio range including a maximum speed ratio; and
   a microprocessor programmed to:
      determine whether or not the ignition switch is in a starting position of the engine; and
      control the speed ratio of the toroidal continuously variable transmission to gradually vary towards a predetermined target speed ratio when the ignition switch is in the starting position and the speed ratio is smaller than the predetermined speed ratio range.

12. The control device as defined in claim 11, wherein the toroidal continuously variable transmission further comprises a step motor which varies the speed ratio of the toroidal continuously variable transmission according to a signal, and the microprocessor is further programmed to set the signal so as to gradually vary the speed ratio to the target speed ratio.

13. The control device as defined in claim 11, wherein the vehicle is further provided with a warning device and the microprocessor is further programmed to turn on the warning device when it is determined that the vehicle is starting under a small speed ratio.

14. The control device as defined in claim 13, wherein the control device further comprises a sensor which detects the speed ratio of the toroidal continuously variable transmission, and the microprocessor is further programmed to determine whether or not the speed ratio has reached the target speed ratio, and prevent the warning device from operating when the speed ratio has reached the target speed ratio.

15. The control device as defined in claim 13, wherein the microprocessor is further programmed to limit an operation of the warning device within a predetermined time period.

16. The control device as defined in claim 11, wherein the microprocessor is further programmed to control the speed ratio of the toroidal continuously variable transmission to coincide with a target speed ratio in the predetermined speed ratio range when the ignition switch is in the starting position and the speed ratio is not smaller than the predetermined speed ratio range, and control the speed ratio of the toroidal continuously variable transmission to approach the target speed ratio in the case where the ignition switch is in the starting position and the speed ratio is smaller than the predetermined speed ratio range, at a speed lower than in the case where the ignition switch is in the starting position and the speed ratio is not smaller than the predetermined speed ratio range.

17. A control device for a toroidal continuously variable transmission joined to an engine of a vehicle, the vehicle being provided with an ignition switch for starting operation of the engine, the control device comprising:
   means for detecting that a speed ratio of the toroidal continuously variable transmission is smaller than a predetermined speed ratio range including a maximum speed ratio;
   means for determining whether or not the ignition switch is in a starting position of the engine; and
   means for controlling the speed ratio of the toroidal continuously variable transmission to gradually vary towards a predetermined target speed ratio when the ignition switch is in the starting position and the speed ratio is smaller than the predetermined speed ratio range.

* * * * *